(12) United States Patent  
Oyachi et al.

(10) Patent No.: US 6,991,737 B2
(45) Date of Patent: Jan. 31, 2006

(54) FILTERING METHOD

(75) Inventors: Hiroyuki Oyachi, Handa (JP); Hitoshi Yonekawa, Chita-gun (JP); Nobuhiro Aoki, Nagoya (JP); Naoki Murata, Chita-gun (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 10/792,913

(22) Filed: Mar. 5, 2004

(65) Prior Publication Data

US 2004/0200785 A1 Oct. 14, 2004

(30) Foreign Application Priority Data

Mar. 10, 2003 (JP) .......................... 2003-063414

(51) Int. Cl.
 *C02F 1/30* (2006.01)

(52) U.S. Cl. ............ 210/767; 210/650; 210/798; 210/321.82; 210/321.89; 210/496; 210/510.1; 422/180; 55/523; 55/DIG. 30; 502/527.18; 502/527.19

(58) Field of Classification Search .............. 210/650, 210/767, 797, 798, 321.82, 321.89, 496, 210/510.1; 422/180; 55/523, DIG. 30; 502/527.18, 502/527.19
See application file for complete search history.

(56) References Cited

U.S. PATENT DOCUMENTS 4,781,831 A * 11/1988 Goldsmith .............. 210/247
5,009,781 A * 4/1991 Goldsmith .............. 210/247
5,108,601 A * 4/1992 Goldsmith .............. 210/247
5,855,781 A * 1/1999 Yorita et al. ............ 210/321.82
6,077,436 A   6/2000 Rajnik et al. ............ 210/650
6,126,833 A * 10/2000 Stobbe et al. ............ 210/650
2004/0200785 A1 * 10/2004 Oyachi et al. .......... 210/767

FOREIGN PATENT DOCUMENTS

| DE | 4324347 | 1/1994 |
| EP | 0 923 983 | 8/1999 |
| GB | 2 388 807 | 5/2002 |
| JP | 6-16819 | 3/1994 |
| JP | 6-88918 | 3/1994 |
| JP | 6-99039 | 4/1994 |
| JP | 11-169679 | 6/1999 |
| JP | 11 169681 | 6/1999 |

* cited by examiner

*Primary Examiner*—Robert James Popovics
(74) *Attorney, Agent, or Firm*—Parkhurst & Wendel, LLP

(57) ABSTRACT

A filtering method including the steps of preparing a water purifying apparatus 1 with a cell structure 2 having units for constituting cell structure 4, and a cap portion 3, and making raw water flow into cells 10 from one end, and filtered by a partition walls 9 to take out filtrate water from the side of an outer peripheral surface 8. The cell structure 2 is so constructed that the ratio of maximum value to minimum value in water permeability among the partition walls 9 provided therein is within a range from of 110 to 300% in terms of percentage, and the cells 10 located on the side of an outer periphery 7 of the cell structure 2 have a greater water permeability.

5 Claims, 3 Drawing Sheets

FILTERING METHOD

FIELD OF THE INVENTION AND RELATED ART STATEMENT

The present invention relates to a filtering method and more specifically to a filtering method capable of performing stable, continuous operation for a long period of time.

Conventionally, we use river surface water, well water, lake water or the like as a source of tap water by purification. Such raw water has been purified by the method that comprises coagulating sedimentation, sterilization/pasteurization with chlorine, or the like. However, in recent years, in view of a rise in living standards and concern about safety, filtration using a membrane has often been applied for purification treatment of water. Furthermore, such a membrane is also used for purification treatment of wastewater such as factory wastewater, domestic effluent, collective housing wastewater or the like as a corollary that problems concerning environmental protection have become hot topics.

A porous ceramic filter or the like can be exemplified as a membrane usable for such water purifying treatment or the like. The porous ceramic filter has a high corrosion resistance, and thus it is less deteriorated than a ceramic filter without such resistance. It also has a high reliability because the pore size regulating a filtration capability can be precisely controlled. Furthermore, the filterability of the membrane can be easily recovered by the back washing or cleaning with chemicals when the filterability of the membrane is reduced due to accumulated foreign substances that are contained in raw water or the like on the surface of the membrane and/or within pores. The filterability of the membrane is reduced with an increase in the total amount of raw water subjected to filtration treatment, though.

A cell structure having a plurality of cells defined by partition walls made of a porous ceramic and acting as flow channels of raw water has conventionally been used for such purpose (this type of cell structure is often referred as a multi-channel type membrane element). In this type of the cell structure, the filtration membrane is formed on the respective partition walls defining the respective cells of the cell structure (hereinafter referred to as simply partition walls). Making raw water flow into the respective cells, and then making it permeate through the filtration membrane formed on the partition wall provides the purification.

It was presumed that the total filtration performance could be improved by making the performance of each cell uniform, when such a cell structure was used for filtration. Thus, many attempts have been made, aiming at making the respective permeation amount of raw water through the partition walls of each cell uniform at a predetermined value, and various proposals have been made (See, for example, JP-A-6-16819, JP-A-6-86918, JP-A-6-99039, and JP-A-11-169679).

However, in the case where such a structure is employed for filtration, the partition walls are clogged evenly by foreign substances, and the effective membrane area is reduced during a long use of the cell structure for filtration. Resultantly, the filtration efficiency often drops during the latter half of the filtering operation.

SUMMARY OF THE INVENTION

The present invention has been completed to solve the above-mentioned problem. Therefore, the present invention is to provide a filtering method capable of performing stable, continuous operation for long time.

The following filtering method has been completed, as the result of intensive studies.

A filtering method comprising;

preparing a water purifying apparatus comprising a cell structure and a cap portion, the cell structure being configured to combine, in a direction perpendicular to cells, one or more units for constituting cell structure, each having a plurality of cells defined by partition walls made of a porous body to be flow channels of raw water, and the cap portion arranged with a predetermined space formed at one other end lest the raw water flowing into the cells from one end of the cell structure should pass through the cells and flow to the outside from the other end, the raw water being made to flow into the cells from one end of the cell structure of the water purifying apparatus, flowing raw water from one end of said cell structure to make raw water flowed into the cells permeate through the partition walls to remove foreign substances contained in raw water with the partition walls to filter raw water, and, taking out a filtered raw water as a filtered water from the side of an outer peripheral surface of the cell structure, wherein the partition walls of the cell structure are so constructed that a ratio of water permeability between partition walls showing a maximum water permeability and partition walls showing a minimum water permeability among the partition walls is within a range of from 110 to 300% in terms of percentage, and wherein cells located on the outer periphery of the cell structure have a larger water permeability, whereby raw water flowed into the predetermined space of the cap portion from the cells with a smaller water permeability is made to flow conversely from the end facing the cap portion in the cells with a larger water permeability of the cell structure, and the raw water flowing conversely is made to permeate the partition wall to be filtered, and thereafter the filtered raw water is taken out as the filtrate water from the side of the outer peripheral surface of the cell structure.

It is preferable to use, as a cell structure for the present filtration method, a cell structure having at least one water channel formed in a slit form in a predetermined length and penetrating the partition walls between predetermined cells. The predetermined cells are formed to be arrayed almost linearly when the cell structure is cut in a plane perpendicular to the cells. Said at least one water channel is formed in the above-mentioned state to connect the predetermined cells communicably to each other at a predetermined distance from the one end face of the cell structure. Both ends of the predetermined cells of the units constituting the cell structure thus connected are plugged with an impervious material, and the units constituting cell structure are configured symmetrically with respect to the predetermined cells thus plugged. In this case, permeating occurs through the cells constituting the units for constituting cell structure to filter the raw water. Thereafter, the filtered raw water is made to flow into the water channel or the predetermined cells connected communicably with the water channel and pass through the water channel to be taken out as filtrated water from the side of the outer peripheral surface of the cell structure.

It is preferable to use a cell structure having three or more rows of the cells arrayed almost in parallel with the slit-like water channel in the present filtering method.

It is preferable to use a cell structure being made of a ceramic in the present filtering method.

In the case of the present filtering method, it is preferable to perform further back washing of the units constituting cell structure after the filtered raw water is taken out from the side of the outer peripheral surface of the cell structure. In this case, the back washing of the cell structure is performed by pressurizing the filtered water at a pressure of 200 to 1000 kPa supplied from the side of the outer peripheral surface permeate through the partition walls, while pushing out the foreign substances captured on the partition walls. At the same time, a pressurized gas of 100 to 500 kPa is further made to flow from the other end of the cell structure to make the filtered water flow into the cells together with the foreign substances. Thus, the filtrate water and foreign substances flowing into the cells are made to pass through the cells, and are discharged from the end of the cell structure on the side from which the raw water is made to flow in.

DETAILED DESCRIPTION OF THE PREFERRED EMBODIMENTS

Figure 1:
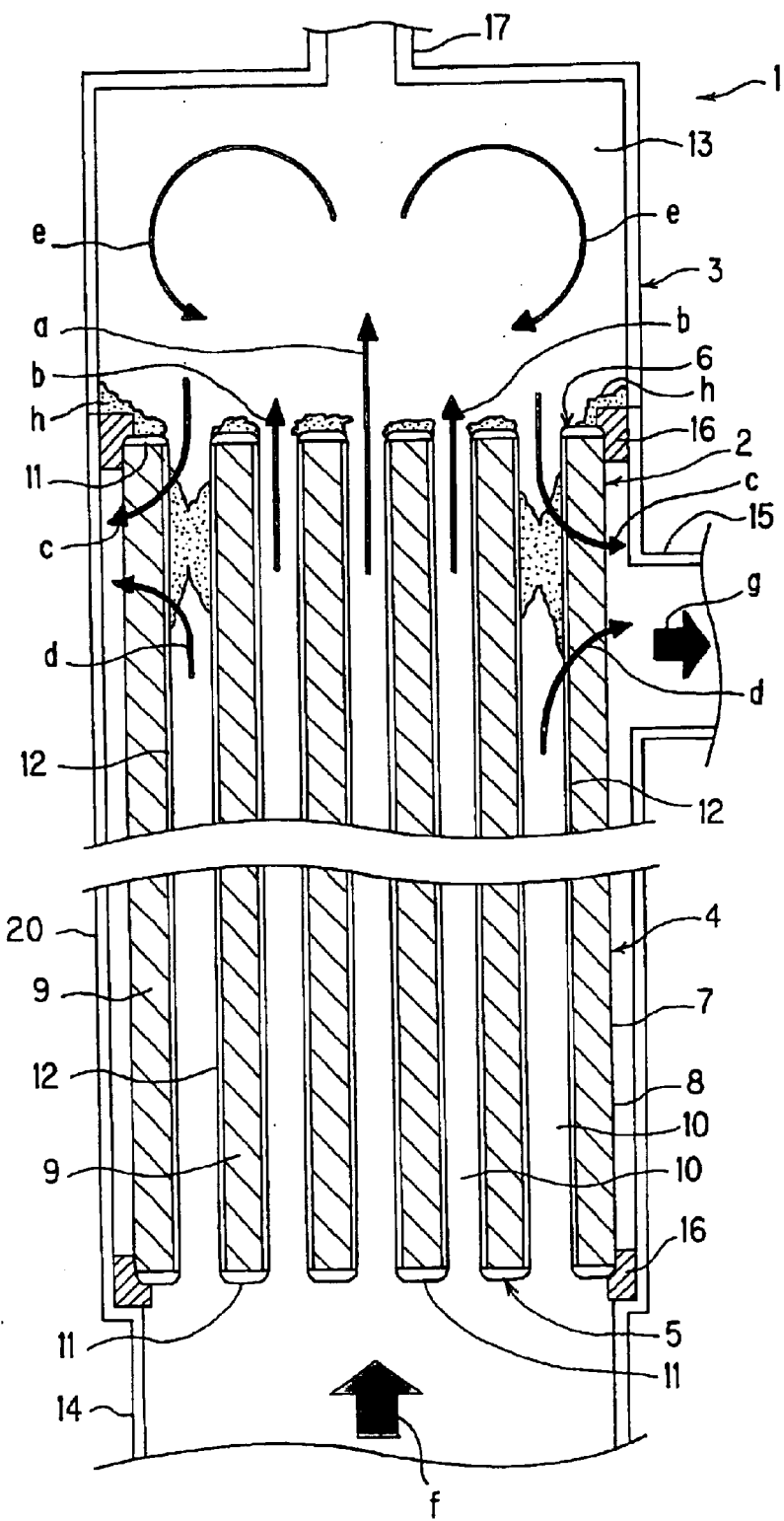
FIG. 1 is a cross-sectional view obtained by cutting a cell structure in a plane including the central axis of the cell structure, which exemplarily shows a water purifying apparatus for use in one embodiment of a filtering method according to the present invention.

Hereinafter, the preferred embodiments of the present invention will be described specifically in reference to the drawings. However, the present invention is not limited to the embodiments below and it should be understood that modification, improvement in design, or the like can be made as required, based on normal knowledge of those in the art within the scope not departing from the intention of the present invention. Furthermore, the same numerals or signs are used in principle to show elements and/or components having the same function or action in the drawings.

The cell structure comprises at least one unit constituting cell structure having a plurality of cells defined by partition walls made of a porous body, and a cap portion provided at one end thereof. Raw water is made to flow in from the other end of the cells, and a part of raw water flowed into the respective cells is made to permeate the partition walls, and the remaining raw water is made to flow into a predetermined space of the cap portion. The partition walls are so configured that the relative ratio of a maximum value to a minimum value in water permeability among the partition walls constituting the cells of the units constituting cell structure is within a range of from 110 to 300%. Furthermore, the water permeability in the cells located on an outer periphery side of the units constituting cell structure is made to be larger.

Accordingly, the raw water flowed into the predetermined space of the cap portion from the cells having partition walls with a lower water permeability is made to flow conversely from the other end facing the cap portion in the cells having the partition walls capable of permeating water in a larger amount, that is, a higher water permeability, and the cells located on the outer peripheral side in the cell structure. Thus, hereafter, the capability of permeating water is referred to as water permeability. The raw water flowed conversely is made to permeate through the partition walls for filtration; thereafter the filtered water is taken out as filtered water from the outer peripheral surface side of the cell structure. Thereby, a part of foreign substances in the raw water is accumulated in the predetermined space of the cap portion, and the amount of foreign substances collected in the partition walls of the unit for constituting cell structure per unit time is lessened. This arrangement makes it possible to enable stable, continuous operation for a long time. Furthermore, we have found that, in the cells having the wall partitions with a more higher water permeability and the cells located on the outer peripheral side, the accumulation of foreign substances in a compact state is promoted at the divide where an amount of the raw water flowed into from the end of the cells and the amount of the raw water flowed conversely are in balance. Consequently, this balance further guarantees stable, continuous operation for long time.

FIG. 1 is a cross-sectional view obtained by cutting a cell structure in a plane including the central axis of the cell structure, which exemplarily shows a water purifying apparatus usable for the filtering method of the present invention. As shown in FIG. 1, a water purifying apparatus 1 usable for the filtering method of the present invention comprises a cylindrical cell structure 2 made of units constituting cell structure 4; said cell structure having a plurality of cells defined by partition walls 9 made of a porous body and acting as flow channels for raw water. The water purifying apparatus 1 further comprises a cap portion 3 arranged with a predetermined space 13 formed at one other end 6 lest the raw water flowing into the cells 10 from one end 5 of the cell structure 2 should pass through the cells 10 and flow to the outside from the other end 6. The end 5 and the end 6 are hereinafter sometimes referred to as "the end on the raw water inflow side", and "the end on the cap portion side", respectively. Here, with respect to the units constituting cell structure 4, cells 10 are arrayed in rows and each of such arrayed rows is called one unit.

The cell structure 2 is housed in a housing 20 via packing 16. An inflow channel 14 for making raw water flow into the units constituting cell structure is provided in the housing 20 at one end corresponding to the end on the raw water inflow side 5 of the units constituting cell structure. The cap portion 3 is provided at the other end thereof. An outflow channel 15 for making filtered water flow out is also provided at a side surface part of the housing 20. An inflow channel 17 for pressurized gas is provided in the cap portion 3. The inflow channel 17 for pressurized gas is closed with a valve (not shown), during filtration of water.

The present filtering method using this water purifying apparatus 1 comprises the steps of making raw water flow into the cells 10 from the end on the raw water inflow side 5 of the cell structure 2 of the water purifying apparatus 1 through inflow channel 14, making the raw water flowed into the cells 10 permeate through the partition walls 9 to filter raw water by collecting foreign substances contained in the raw water by the partition walls 9, and thereafter taking out filtered water from the side of an outer peripheral surface 8 of the cell structure. The obtained filtered water is transferred to an exterior storage tank (not shown) or the like via the outflow channel 15. Then, a part of the raw water flowing into the cells 10 from the end on the raw water inflow side 5 of the cell structure 2 permeates through the partition walls 9 from the cells 10 having a less lower water permeability. The remaining part is made to flow into the predetermined space 13 of the cap portion 3 to accumulate a part of the foreign substances contained in the raw water in the predetermined space 13 while circulating the raw water flowed into the predetermined space 13 within the space 13. Then, the raw water circulated within the predetermined space 13 is made to flow conversely from the end facing the cap portion 3 in the cells 10 having the wall partitions with a higher water permeability. The cells 10 are located on the side of an outer periphery 7 of the cell structure. The raw water being flowed conversely is made to permeate through the partition walls 9 for filtration, and thereafter, permeated water is taken out as filtrate water from the outer peripheral surface side 8 of the cell structure. Thus obtained filtrate water is transferred to the exterior storage tank (not shown) or the like via the outflow channel 15.

Furthermore, according to the filtering method of the present invention, it is preferable to use the cell structure 2 having cells with the partition walls 9 with a different water permeability at a predetermined level, with the cells being located on the outer periphery side and having a higher water permeability. The difference in the water permeability between the partition walls having a maximum water permeability and those having a minimum in water permeability with respect to the amount of the raw water flowing into the cells 10 is such that the ratio of the maximum permeability to the minimum permeability is within the range of from 110 to 300% in terms of percentage. If this percentage is smaller than 110%, stable and continuous filtration operation for a long time is not achieved because the formation of circulating flow becomes difficult. In contrast, if the ratio is larger than 300%, the amount of the raw water permeating the partition walls 9 becomes too large, whereby foreign substances cannot be accumulated by effectively making a part of the raw water flow into the predetermined space 13 and circulating it. Long time stable and continuous filtration operation is not achieved in this case. Incidentally, this percentage is more preferably 120 to 240%. Here, the expression "minimum value of the water permeability" means a value of the water permeability shown by the partition wall(s) 9 having the least water permeability among the whole cell structure 2. The one "maximum value of the water permeability" means a value of the water permeability shown by the partition wall(s) 9 having the largest water permeability among the whole cell structure 2.

Referring to FIG. 1, the flow of the raw water (filtrate water) will be described exemplarily using arrows. Among raw water f flowing in from the end on the raw water inflow side 5 of the cell structure 2, much of the raw water flowed into the cells 10 located at the center of the cell structure 2 passes through the partition walls of cells 10 and flows as raw water a into the predetermined space 13 of the cap portion 3 with a high pressure. The raw water flowed into the cells 10 located on the outer peripheral side apart from the center of the cell structure 2 passes through partition walls of the cells 10 and flows into the predetermined space 13 of the cap portion 3 as raw water b in a smaller amount with a lower pressure than those of the raw water a. In addition, among the raw water f, almost all amounts of the raw water flowed into the cells 10 closest to the outer periphery 7 of the cell structure, that is, the cells 10 at an outmost periphery pass through the partition walls 9 as raw water d. This water is called as filtrate water after permeating through the partition walls. In this way, by making almost all the raw water d permeate through the partition walls 9, water pressure at the end on the cap portion 3 side to the side of the predetermined space 13 of the cap portion 3 in the cells 10 at the outmost periphery becomes very low, whereby the raw water flowing into the predetermined space 13 of the cap portion 3 flows conversely as water c to be treated and then permeates through the partition wall 9 to be taken out as the filtrate water. As to the above-mentioned flow of the raw water, there is shown a case where the cells 10 located closer to the outer periphery 7 of the cell structure have a larger water permeability. In FIG. 1, arrows a to g exemplarily indicate the flows of the raw water (partially filtrate water), arrow e indicates the raw water circulating within the predetermined space 13, and arrow g indicates the filtrate water.

As described above, according to the filtering method of the present invention, a part of foreign substances in the raw water accumulates in the predetermined space 13 of the cap portion 3, and the amount of the foreign substances collected in the partition walls 9 of the cell structure 2 per unit time is lessened. Thus, stable, continuous operation for a long time becomes possible. One may have the cell structure provided with cells having a high water permeability at the periphery side 7 of the cell structure, and with cells having a low water permeability at the center portion of the cell structure as intended. For example, one may use materials capable of making a diameter of the pores larger to constitute the partition walls at the periphery side. Or one may use materials capable of making a diameter of the pores less to constitute the partition walls at the center portions of the cell structure, vice verse. One may have cells by making a membrane thickness of the partition walls for the cells located at the periphery side thinner. Or one may have cells by making a membrane thickness of the partition walls for the cells located at the center portion thicker, or vice versa. One may have the cells by using material having a larger particle size to constitute a filtration membrane for the cells located at the periphery side. Or one may have the cells by using material having a smaller particle size to constitute a filtration membrane for the cells located on the center side. Furthermore, when the raw water f is made to flow in, a flow rate of the raw water flowing into the cells located on the center side may be increased.

A material of the porous body for use in the units constituting cell structure 4 usable for the present filtering method is not particularly limited as long as it is a porous body that can be used as a membrane. Ceramics, however, are preferable due to their strength and durability.

Furthermore, a fine pore diameter of the porous body can be selected as required according to a purpose or application of the units for constituting cell structure 4.

In the present filtering method, filtration may be performed only by the porous body constituting the partition walls 9. However, in view of improving a separation performance while securing the processing speed, it is preferable to use the material of partition walls 9 having the fine pores of a relatively large diameter as a porous substrate, and form a filtration membrane 12 having fine pores of a smaller diameter than that of the partition walls on the surface of the porous substrate. This structure can suppress pressure loss when the raw liquid permeates through the partition walls 9 even if an average fine pore diameter in the filtration membrane 12 is decreased. As shown in FIG. 1, this case is preferable because the formation of the filtration membrane 12 on the surface of the partition walls 9 enables the above-mentioned purpose to be achieved effectively. The average fine pore diameter of the filtration membrane 12 can be selected as required according to a purpose or application of the water purifying apparatus 1, that is, particle diameters of foreign substances contained in the raw liquid to be filtered. However, for example, the average fine pore diameter in the filtration membrane 12 is preferably about 01 to 2.0 $\mu$m, and more preferably about 0.1 to 0.7 $\mu$m.

Although a material for the filtration membrane 12 is not particularly limited, it is preferable to use a material containing ceramic particles and a sintering aid for filtration membrane. The ceramic particles preferably have an average particle diameter of about 0.1 to 10 μm. Because selecting a material having a smaller particle diameter reduces the fine pore diameter after sintering, the particle diameter can be selected as required in order to obtain an appropriate fine pore diameter according to a purpose of filtration. For example, the average particle diameter of the ceramic particles is preferably set to about 0.2 to 5.0 μm, and more preferably set to about 0.4 to 2.5 μm. The filtration membrane 12 can be formed by applying these ceramic particles and the sintering aid for filtration membrane in a slurry state to the surface of the substrate and thereafter burning them. Furthermore, although the filtration membrane 12 may be provided as a single layer, the membrane may also be provided as two or more layers. In the case of two or more layers, it is preferable that the average fine pore diameter of the filtration membrane 12 of an outmost layer is the smaller or smallest one, and that the fine pore diameters are sequentially increased toward the partition walls 9.

Furthermore, as shown in FIG. 1, a sealing layer 11 is preferably formed on a surface including an end surface, that is, an end surface of the partition walls 9. The sealing layer is formed usually in at least any one of the both ends of the units constituting cell structure 4, that is, the end on the raw water inflow side 5 and/or the end on the cap portion side 6. In the case where the units constituting cell structure 4 each have the filtration membrane 12 as described above, by the above-mentioned structure, one can prevent permeation of the raw liquid from the end of the units for constituting cell structure 4 (the end on the raw water inflow side 5 and/or the end on the cap portion side 6), on which the filtration membrane 12 is not formed.

Although a material of this sealing layer 11 is not particularly limited, in the case where the units constituting cell structure 4 are made of a ceramic, the sealing layer material is preferably made of a ceramic in view of strength and adhesiveness with the substrate composing the units constituting cell structure 4. It is more preferable to use the one made of a ceramic material containing components similar to a part of components contained in the partition walls 9. However, because it is required not to make the raw liquid permeate substantially through the ceramic, it is preferable to use a glaze obtained by fritting a ceramic or the like. It is particularly preferable to use a glaze obtained by fritting a material containing silica and alumina as main components, and 10 mass % or less of zirconia, or the like. Methyl cellulose may be present as a binder.

Furthermore, the size of the cell structure 2 for use in the filtering method of the present invention is not particularly limited, and any shape can be selected according to a purpose/application, installation location or the like. For example, in the case of the cell structure 2 of a large-scaled water purifying apparatus used in a water purifying plant, it is preferable to have a cylindrical shape having an end surface diameter of 30 to 500 mm and an axial length of 500 to 2000 mm.

Furthermore, the amount of water to pass through the cell structure 2 is not particularly limited. However, in the case of the cell structure 2 of a large-scaled water purifying apparatus used in a water purifying plant, the amount of water to pass at a water temperature of 25° C. under a water pressure of 1000 kPa is preferably 15 to 300 m$^3$/m$^2$/day.

Furthermore, the cross-sectional shape of the cells 10 of the units constituting cell structure 4 used in the filtering method of the present invention can be an arbitrary polygon such as a triangle, square, pentagon and hexagon, circle, ellipsoid or the like, or a corrugated shape or the like. The equivalent inside diameter of the cells 10 is not particularly limited in size, either. However, if the equivalent inside diameter is too small, the resistance at inflow time of the raw liquid may become too large. On the contrary, if the equivalent inside diameter is too large, a sufficient filtration area may not be able to be obtained. Although a preferable range of the equivalent inside diameter of the cells 10 varies depending upon the viscosity of raw liquid to be filtered, for example, it is preferably 1.0 to 10 mm, and more preferably 1.5 to 7 mm. By setting the equivalent inside diameter to these ranges, uniform membrane formation can be achieved easily when forming the filtration membrane 12, and a relatively large area of the filtration membrane 12 per unit volume can be obtained. The equivalent inside diameter of the cell means a diameter of a circle having the same area as that of a cross section of the cell. Furthermore, the number of the cells 10 per unit cell structure is not particularly limited, and those in the art can select it as required in relation to strength, size, and processing amount.

Furthermore, the arrangement condition of the cells 10 in the cell structure 2 is not particularly limited. However, three or more rows of the cells 10 are preferably arranged in a cross section when cutting the cell structure 2 in a plane perpendicular to the axis of the cell structure 2. By arranging three or more rows in such a manner, the cells positioned closer to the outer peripheral surface of the cell structure have a higher water permeability because the water permeability, namely, the ratio at which the raw water flowing into the respective rows of the cells permeates through the partition wall is varied. Furthermore, the larger filtration area may be secured by increasing the number of cells 10 to be arrayed, whereby the amount of water to pass can be increased, and further downsizing of the cell structure 2 is realized. The most compact packing of the cells may be realized by arraying the respective cells 10 so that lines connecting centers of the cells form a regular triangle, under the assumption that the shape in the end surface of each of the cells 10 is circular. This is one of the preferable ways of arraying cells.

In the filtering method of the present invention wherein the water purifying apparatus 1 as shown in FIG. 1 is used, it is preferable to perform back washing for the cell structure 2 after raw water filtered has been taken, out as filtrate water from the outer peripheral surface 8 side of the cell structure. The back washing is carried out in such a manner that the filtrate water pressurized at a pressure of 200 to 500 kPa is made to permeate through the partition walls 9 from the outer peripheral surface 8 side of the cell structure and foreign substances collected in the partition walls 9 are pushed out. At the same time, the pressurized gas of 100 to 500 kPa is further made to flow in from the end on the cap portion side 6 to make the filtrate water flow into the cells 10 together with the foreign substances. Thereby, the filtrate water and the foreign substances flowing into the cells 10 are made to pass through the cells 10 and are discharged from the end on the raw water inflow side 5, namely the end of the cell structure 2 on the side from which raw water is made to flow in. By performing the back washing in this way, the foreign substances accumulated in the predetermined space 13 of the cap portion 3 and the filtration membrane 12 can be reliably removed. In addition, the filtration method of the present invention can be performed repeatedly.

Figure 2:
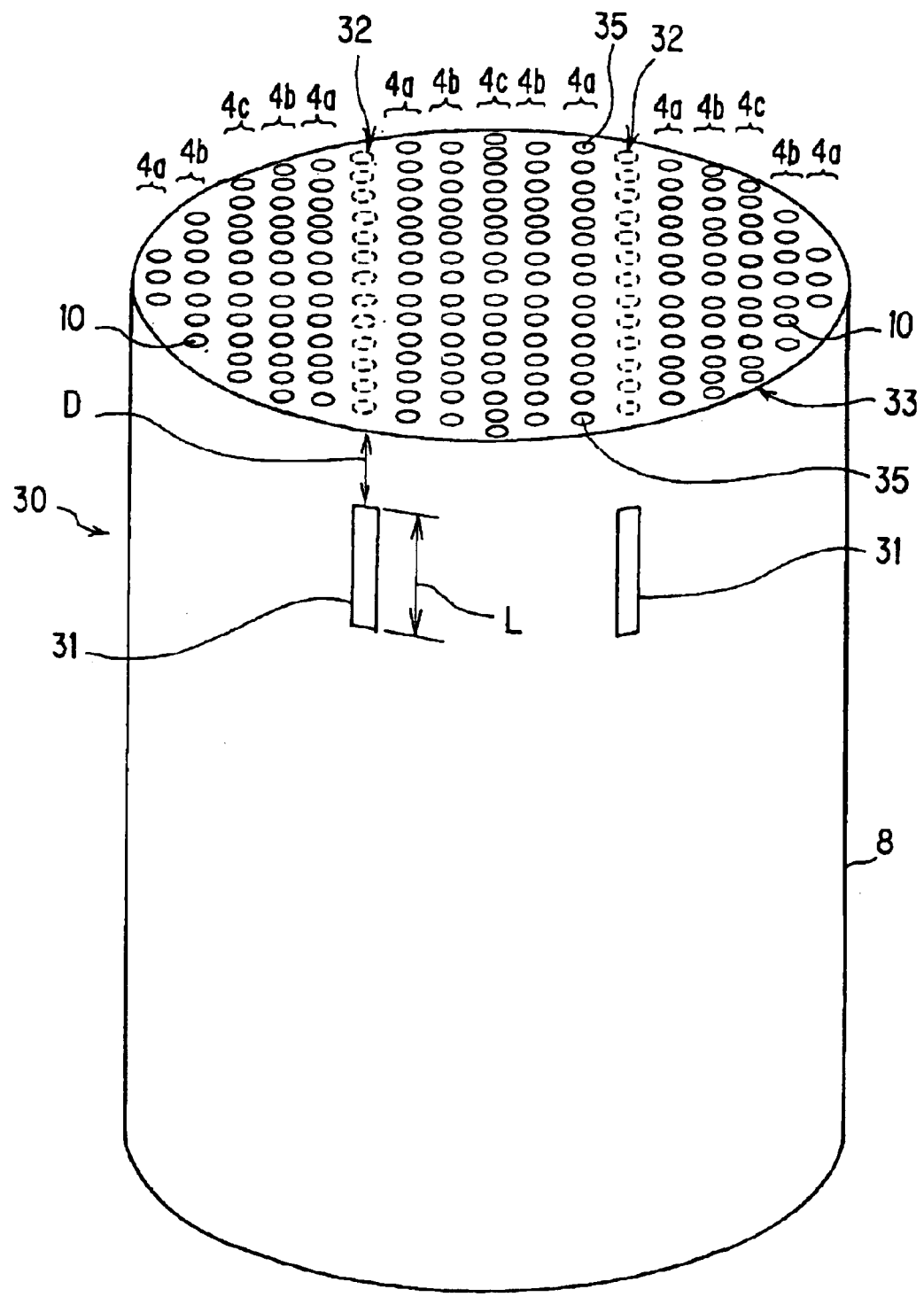
FIG. 2 is a perspective view exemplarily showing a cell structure for use in another embodiment of the filtering method according to the present invention.

FIG. 2 is a perspective view exemplarily showing a cell structure usable for another embodiment of the filtering method of the present invention.

In the cell structure 30 shown in FIG. 2, three types of units for constituting cell structure 4a, 4b, 4c are arranged in line (in series), almost in parallel with each other; thereby the assembled shape as a cell structure is a cylindrical shape as a whole. The cell structure 30 has two slit-like water channels 31 having a predetermined length L in an axial direction, namely the predetermined axial length. Each channel is formed to penetrate a partition wall between predetermined cells 32 which are arrayed almost linearly when cut in a plane perpendicular to the cells 10. Thus, the predetermined cells 32 are connected communicably with each other at a predetermined distance D axially from one end 33 of the cell structure 30. Then, units constituting cell structure 4a, 4b and 4c are configured symmetrically with respect to each of the water channels 31. As to the arrangement of the units constituting cell structure, the cells 10 almost in parallel with the water channels 31 are preferably arranged in three or more rows. By arranging three or more rows in such a manner, the water permeability is varied, so that the cells positioned closer to the water channels and an outer peripheral surface of the cell structure show higher water permeability.

Figure 3:
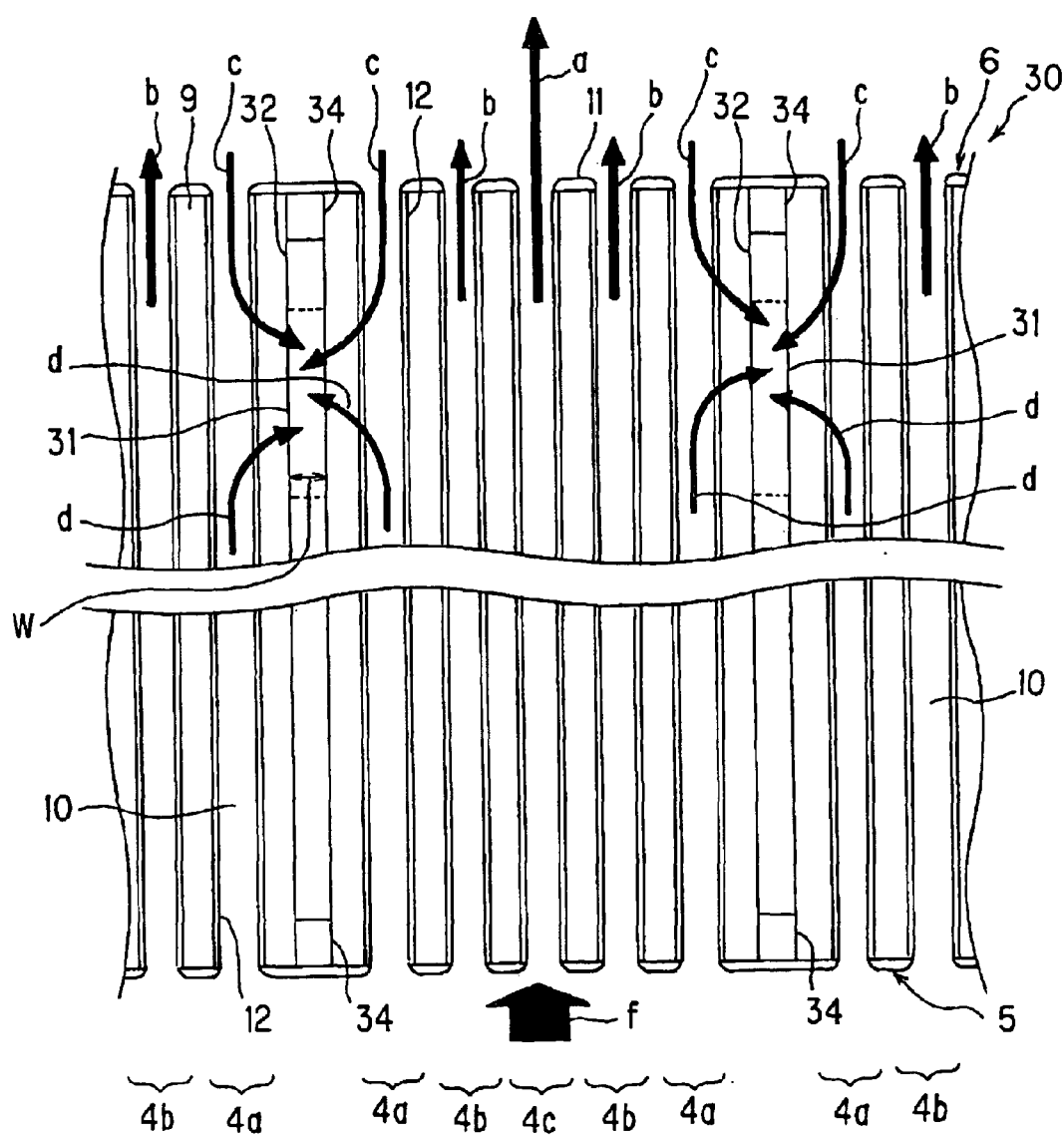
FIG. 3 is a cross-sectional view obtained by cutting the cell structure for use in said another embodiment of the filtering method according to the present invention in a plane that passes the central axis of the cell structure and is perpendicular to a slit-like water channel.

FIG. 3 is a cross-sectional view obtained by cutting the cell structure 30 shown in FIG. 2 in a plane that passes the central axis of the cell structure and is perpendicular to the slit-like water channels 31. In FIG. 3, at both ends of the predetermined cells 32, there are formed plugged parts 34 made of an impervious material from each end up to a predetermined height or depth. Furthermore, in the case of the present cell structure 2 such as the one shown in FIG. 1, the filtration membrane 12 is formed on the surface of the partition walls 9, and the sealing layer 11 is formed on both end surfaces of the partition walls 9 located on the both end surfaces of the cell structure 2.

The distance D from the slit-like water channels 31 to the one end 33 of the cell structure 30, as shown in FIG. 2, is not particularly limited, and is determined as required according to the size of the cell structure 30 or the like. The distance, however, is preferably set to 20 mm to 50 mm. If it is below 20 mm, sealing between the cell structure and the casing is difficult, and if it is above 50 mm, plugging of the cells at the end face is difficult to perform. Furthermore, the predetermined length L of the slit-like water channels 31 in the axial direction of the cell structure 30 is not particularly limited, and is determined as required according to the size of the cell structure 30 or the like. However, the predetermined length is preferably set to 40 mm to 200 mm because if it is below 40 mm, the performance of permeating water is low, and if it is above 200 mm, the strength of the cell structure is lowered. Furthermore, a width W of the slit-like water channels 31, as shown in FIG. 3, namely, a width in a direction perpendicular to the axial direction of the cell structure 30 in the cross-sectional view of FIG. 3 is not particularly limited. This width is determined as required according to the diameter of the cells 10, the thickness of the partition walls 9 or the like. However, the width is preferably set to 2 mm to 3 mm. If it is below 2 mm, the performance of permeating water is low, and if it is above 3 mm, the membrane area is decreased.

In addition, the other structures are similar to those of the above-mentioned cell structure 2 as shown in FIG. 1.

The above-mentioned cell structure 30 is housed in the housing 20 similarly to the cell structure 2 as shown in FIG. 1. That is, the cell structure is housed by placing it directing the end on the side closer to the water channels 31 to be located on the cap portion 3 side. By housing the cell structure in such a manner, the raw water f is made to flow in as shown in FIG. 1, whereby the flows of the raw water (partially filtrate water) exemplarily shown by arrows a to d in FIG. 3 can be formed.

Specifically, as shown in FIG. 3, the raw water f flowing in from the end on the raw water inflow side 5 of the cell structure 30 is divided into two flows. A large amount of the raw water that flows into the cells 10 constituting the units for cell structure 4c located at the center of the cell structure 30 out of the units constituting cell structure between the two water channels 31 and 31, passes through the cells 10 and flows into the predetermined space 13 (refer to FIG. 1) of the cap portion 3 (refer to FIG. 1) as the raw water a at a high pressure. On the other hand, the raw water that flows into the cells 10 located immediately outside of the units for constituting cell structure 4c (on the side closer to the water channels 31 and 31), which constitute the units for cell structure 4b, passes through the cells 10 and flows into the predetermined space 13 (refer to FIG. 1) of the cap portion 3 (refer to FIG. 1) as the raw water b at a lower pressure in a smaller amount than those of the raw water a. The raw water flowing into the predetermined space 13 is circulated within the predetermined space 13 as in the above-mentioned cell structure 2 as shown in FIG. 1, where a part of foreign substances contained in the raw water are accumulated in the predetermined space 13 to make into accumulated foreign substances h (refer to FIG. 1). Then, among the raw water f, almost all of the raw water flowing into the units constituting cell structure 4a closest to (adjacent to) the water channels 31 passes through the partition walls 9 and flows into the predetermined cells 32 connected communicably with the water channel 31 or the water channels 31 as the raw water (filtrate water after permeating the partition wall) d. The filtrate water flowing into the predetermined cells 32 connected communicably with the water channel 31 or the water channel 31 passes through the water channels 31, and thereafter can be taken out as filtrate water from the outer peripheral surface 8 side of the cell structure as shown in FIG. 2. In this way, by making almost all of the raw water d permeate the partition wall 9, a water pressure applied from the end of the cells 10 adjacent to the water channels 31 on the side of the cap portion 3 ((refer to FIG. 1) to the side of the predetermined space 13 (refer to FIG. 1) of the cap portion 3 (refer to FIG. 1) becomes very low, whereby the raw water flowing into the predetermined space 13 (refer to FIG. 1) of the cap portion 3 (refer to FIG. 1) flows conversely as the raw water (filtrate water after permeating the partition wall) c from the cell 10s constituting the units for cell structure 4a adjacent to the water channels 31, and permeates the partition wall 9 to be taken out as the filtrate water.

Furthermore, almost all of the raw water f flowing into cells 35 located at an outmost periphery of the cell structure 30 (refer to FIG. 2) permeates through the partition walls 9 and can be taken out as the filtrate water from the outer peripheral surface 8 of the cell structure similarly to that flowing into the cell 10 closest to (adjacent to) the water channel 31 (raw water (filtrate water after permeating through the partition walls)).

In FIG. 3, among the raw water f flowing in from the end on the raw water inflow side 5 of the cell structure 30, the raw water flowing into the units for constituting cell structure 4a, 4b, 4c (a part of which is not shown) located outside of the water channels 31 forms a fluid state similarly to that flowing into the above-mentioned units for constituting cell structure between the two water channels 31 and 31. As is illustratively shown In FIG. 1, the accumulated foreign substances h are deposited in the predetermined space 13 of the cap portion 3.

As described above, according to the filtering method of the present invention in which raw water is filtered using the cell structure 30 as shown in FIG. 3, a part of the foreign substances in raw water is accumulated in the predetermined space 13 (refer to FIG. 1) of the cap portion 3 (refer to FIG. 1). Thus, the amount of the foreign substances accumulated in the partition walls 9 of the units for constituting cell structure 4 per unit time is decreased, whereby stable, continuous operation for a long time can be performed.

EXAMPLES

Hereinafter, the present invention will be described specifically according to examples; however, it is not limited to these examples.

Used cell structures had a plurality of cells of φ 2 mm, and took a monolithic form with an end surface of φ 180 mm and a length of 1000 mm.

In each of the cell structures, two slit-like water channels were formed as shown in FIG. 2. Three unfired cell structures were prepared; that is, the first one being configured so that seven rows of cells were arranged between the two water channels (Example 1), the second once being configured so that five rows of cells were arranged between the two water channels (the structure as shown in FIG. 2) (Example 2), and the third one being configured so that two rows of cells were arranged between the two water channels (Comparative Example 1). Then, plugging members for forming a plugged part were imbedded in the cells connected communicably with the water channels (the cells 32 shown in FIG. 2).

The pore diameter of a permeation membrane of each of the resultant cell structures was about 0.1 μm. The membrane area of the cell structure used in Example 1 was 12.5 m², the membrane area of the cell structure used in Example 2 was 15 m², and the membrane area of the cell structure used in Comparative Example 1 was 16 m².

Purified water was made to flow in from the end of the raw water inflow side of each of the resultant cell structures under the condition of a water pressure of 0.1 MPa and a temperature of 25° C. for one minute, and the amount of water permeating the partition wall (L/min) was measured for each cell of the respective cell structures. The cells to be measured were cells constituting the respective rows of the cells arranged between the two water channels. Then, the amount of the water permeating through the partition wall in each cell was divided by the net amount of water made to flow in from the end of the raw water inflow side in each cell, and the obtained value was centupled to obtain a permeability. Then, an average permeability was obtained for each row of the cells, which was defined as a cell permeability in each row of the cells. The obtained results are shown in Table 1. In Table 1, the numbering of cells Nos. 1 to 7 of Example 1 was made in the manner mentioned below; cell Nos. 1 and 7 are cells located respectively at the first row counting from the respective two water channels; cell Nos. 2 and 6 are cells located at the second row counting from the respective two water channels: cell Nos. 3 and 5 are cells located at the third row counting from the respective two water channels; and cell No. 4 are cells located in the center row. As for cell Nos. 1 to 5 of Example 2, cell Nos. 1 and 5 are cells located at the first row counting from the respective two water channels; cell Nos. 2 and 4 cells located at the second row counting from the respective two water channels; and cell No. 3 are cells located at the center row. Cell No. 1 of Comparative Example 1 is a cell located at one of the two water channels, and Cell No. 2 thereof is a cell located at another water channel, respectively.

A coagulation membrane filtration test of river surface water was conducted using the above-mentioned cell structures prepared for Examples 1 and 2, and Comparative Example 1, respectively.

Poly Aluminum Chloride (hereinafter referred to as PAC) was added to the river surface water in an amount sufficient to make the concentration therein become 10 mg/L and foreign substances in the river surface water were coagulated. Thereafter, the coagulation membrane filtration test was conducted by making the water subjected to coagulation treatment, as raw water, flow into the respective cell structures used in Examples 1 and 2, and Comparative Example 1 at a flow rate of 2.0 m/day for six hours to obtain filtrate water. Transmembrane pressure differences of the filtration membranes at that time were measured, and changes of the transmembrane pressure differences in Examples 1 and 2, and Comparative Example 1 with respect to time were linearly appropriated and the following equations (1), (2) and (3) can be obtained. In equations (1), (2) and (3), Y represents a transmembrane pressure difference (kPa/min) and X represents a filtration time (min).

Equation (1): Transmembrane Pressure Difference in Example 1

$$Y=0.0167X+10.583 \tag{1}$$

Equation (2): Transmembrane Pressure Difference in Example 2

$$Y=0.0109X+11.79 \tag{2}$$

Equation (3): Transmembrane Pressure Difference in Comparative Example 1

$$Y=0.0054X+12.294 \tag{3}$$

There were calculated increased values of the transmembrane pressure differences per unit area and per unit time (increase rates of the transmembrane pressure differences) with respect to transmembrane pressure differences of Examples 1 and 2, and Comparative Example 1, based on the above-mentioned measurement results of the transmembrane pressure differences. The results are shown in Table 1.

The above-mentioned membrane pressure difference indicates a difference in pressure between the primary side (raw water side) and the secondary side (filtrate water side) of the membrane.

TABLE 1

| | Cell No. | Example 1 | Example 2 | Comp. Example 1 |
|---|---|---|---|---|
| Water permeability (%) | 1 | 128 | 106 | 100 |
| | 2 | 106 | 97 | 100 |
| | 3 | 79 | 92 | |
| | 4 | 72 | 99 | |
| | 5 | 81 | 106 | |
| | 6 | 105 | | |
| | 7 | 128 | | |
| Increase rate of pressure difference (kPa/min · m²) | | $3.38 \times 10^{-4}$ | $7.27 \times 10^{-4}$ | $13.36 \times 10^{-4}$ |

As shown in Table 1, it is understood that as the number of the rows of the cells arranged between the two water channels is larger, the difference between the respective rows in water permeability becomes greater. When the difference in water permeability becomes greater, the amount of raw water that passes through the cells having a smaller permeability to reach the cap portion becomes greater, and the amount of the raw water circulating in the predetermined space of the cap portion becomes large. Accordingly, the amount of foreign substances collected (foreign substances accumulated) in the predetermined space of the cap portion becomes large, which enables stable, continuous operation for long time. Furthermore, it is understood that as the number of the rows of the cells arranged between the two water channels becomes larger, the increase rate of the transmembrane pressure difference of the filtration membrane is lower. Because of the lower increase rate in the transmembrane pressure difference of the filtration membrane, the filtration membrane can be used stably, and that the service time as a filtering apparatus increases. Therefore, it is understood that as the number of the rows of the cells becomes larger, the more stable, continuous operation can be performed for a longer time.

As described above, according to the filtering method of the present invention, in a cell structure comprising one or more units constituting cell structure, each having a plurality of cells made of a porous body, and a cap portion provided at one end thereof, raw water is made to flow in from the other end thereof, and a part of the raw water flowing into the respective cells is made to permeate the partition wall partitioning and forming the respective cells, and the other part is made to flow into a predetermined space of the cap portion. In addition, the partition walls of the cells are so constructed that the ratio of the maximum value to the minimum value in the water permeability among the partition walls is within a range of from 110 to 300% in terms of percentage. At the same time, the cells located on the side of an outer periphery of the units constituting cell structure are so constructed that they show greater water permeability. The raw water made to flow into the predetermined space of the cap portion from the cells having smaller water permeability is made to conversely flow from the other end facing the cap portion in the cells having greater permeating water permeability, and the cells located on the outer peripheral side in the cell structure, and the raw water flowing conversely is made to permeate the partition walls to be filtered, thereafter being taken out as filtrate water from the outer peripheral surface side of the cell structure. Thereby, a part of foreign substances in the raw water is accumulated in the predetermined space of the cap portion, and the amount of foreign substances collected in the partition wall of the unit for constituting cell structure per unit time is decreased, which enables a stable, continuous operation for long time. Furthermore, in the cells with a greater water permeability and the cells located on the outer peripheral side, it is found that condensation of the foreign substances is promoted at divides formed at positions where the amount of the raw water flowing in from the end and the amount of the raw water flowing conversely are in balance, and furthermore, stable, continuous operation for a long time is enabled.

What is claimed is:

1. A filtering method comprising;
providing a water purifying apparatus comprising a cell structure and a cap portion, the cell structure being configured to combine, in a direction perpendicular to cells, one or more units constituting cell structure, each having a plurality of cells being defined by partition walls made of a porous body to be flow channels of raw water, the cap portion being arranged with a predetermined space formed at one other end lest the raw water flowing into the cells from one end of the cell structure should pass through the cells and flow to the outside from the other end, the raw water being made to flow into the cells from the one end of the cell structure of the water purifying apparatus,
flowing raw water from one end of said cell structure to make raw water flowed into the cells permeate through the partition walls to remove foreign substances contained in raw water with the partition walls to filter raw water, and,
taking out a filtered raw water as a filtered water from the side of an outer peripheral surface of the cell structure,
wherein the partition walls of the cell structure are so constructed that a ratio of water permeability between partition walls showing a maximum water permeability and partition walls showing a minimum water permeability among the partition walls is within a range of from 110 to 300% in terms of percentage, and wherein cells located on the outer periphery of the cell structure have a greater water permeability, whereby raw water flowed into the predetermined space of the cap portion from the cells with a smaller water permeability is made to flow conversely from the end facing the cap portion in the cells with a greater water permeability of the cell structure, and the raw water flowing conversely is made to permeate the partition wall to be filtered, and thereafter the filtered raw water is taken out as the filtrate water from the side of the outer peripheral surface of the cell structure.

2. The filtering method according to claim 1, wherein the cell structure is a cell structure having at least one water channel in a slit form in a predetermined length and penetrating partition walls between predetermined cells; said predetermined cells being arrayed almost linearly in cross section cutting cells in a plane perpendicular to the cells; said at least one water channel being formed to connect the predetermined cells communicably to each other at a predetermined distance from one end face of the cell structure; both ends of the predetermined cells of units constituting cell structure thus connected being plugged with an impervious material, and the units constituting cell structure being configured symmetrically with respect to the predetermined cells thus plugged to make raw water permeate through the cells constituting the units for cell structure to filter raw water, and thereafter, and make a filtered raw water flow into the water channel or the predetermined cells connected communicably with the water channel and pass through the water channel to be taken out as filtrated water from a side of an outer peripheral surface of the cell structure.

3. The filtering method according to claim 2, wherein the cell structure is a cell structure having three or more rows of the cells arrayed almost in parallel with the slit-form water channel.

4. The filtering method according to claim 1, wherein the cell structure is made of a ceramic.

5. The filtering method according to claim 1, wherein a back washing of the units constituting cell structure is further performed after the filtered raw water is taken out from the side of the outer peripheral surface of the cell structure by making the filtered water pressurized at a pressure of 200 to 1000 kPa supplied from the side of the outer peripheral surface permeate through the partition walls, with pushing out the foreign substances captured on the partition walls, with flowing a pressurized gas of 100 to 500 kPa from the other end of the cell structure to make the filtered water flow into the cells together with the foreign substances to make the filtrate water and foreign substances flowing into the cells pass through the cells, and discharge from the end of the cell structure on the side from which the raw water is made to flow in.

* * * * *